(12) United States Patent
Nam

(10) Patent No.: US 10,266,257 B2
(45) Date of Patent: Apr. 23, 2019

(54) PROPELLER-TYPE VERTICAL TAKE-OFF AND LAND AIRCRAFT WITH TORQUE REMOVAL AND BALANCING FUNCTION

(71) Applicant: Sung Ho Nam, Daegu (KR)

(72) Inventor: Sung Ho Nam, Daegu (KR)

(*) Notice: Subject to any disclaimer, the term of this patent is extended or adjusted under 35 U.S.C. 154(b) by 227 days.

(21) Appl. No.: 15/120,775

(22) PCT Filed: Dec. 10, 2015

(86) PCT No.: PCT/KR2015/013532
§ 371 (c)(1),
(2) Date: Aug. 23, 2016

(87) PCT Pub. No.: WO2016/105001
PCT Pub. Date: Jun. 30, 2016

(65) Prior Publication Data
US 2016/0362178 A1    Dec. 15, 2016

(30) Foreign Application Priority Data
Dec. 26, 2014  (KR) ........................ 10-2014-0190163

(51) Int. Cl.
*B64C 27/82*   (2006.01)
*B64C 27/08*   (2006.01)
(Continued)

(52) U.S. Cl.
CPC .............. *B64C 27/82* (2013.01); *B64C 17/06* (2013.01); *B64C 27/06* (2013.01); *B64C 27/08* (2013.01)

(58) Field of Classification Search
CPC ......... B64C 27/82; B64C 17/06; B64C 27/06; B64C 27/08
See application file for complete search history.

(56) References Cited

U.S. PATENT DOCUMENTS 2,969,937 A * 1/1961 Trojahn ................. B64C 27/14
                                                    180/117
3,799,473 A * 3/1974 Bortel ..................... B64C 27/32
                                                    244/17.19
(Continued)

FOREIGN PATENT DOCUMENTS

KR       10-0832067 B1    5/2008
KR     10-2011-0030094 A  3/2011
(Continued)

*Primary Examiner* — Brian M O'Hara
*Assistant Examiner* — Keith L Dixon
(74) *Attorney, Agent, or Firm* — Korus Patent, LLC; Seong Il Jeong

(57) ABSTRACT

There is provided a propeller-type vertical take-off and land aircraft with a torque removal and balancing function, the aircraft comprising: a body; a body support frame to support the body; at least one main rotor blade provided out of the body; a rotation rotor coupled centrally to the main rotor blade; a rotation drive axis operatively coupled to the rotation rotor; a main rotor motor operatively coupled to the rotation drive axis; and a counter-torque and balancing wheel disposed under the body support frame to be coupled to a torque-removal inverse motor to be configured to rotate in an opposite direction to a rotation of the main rotor blade, wherein the counter-torque and balancing wheel is housed in the body.

3 Claims, 5 Drawing Sheets

(51) Int. Cl.
*B64C 17/06* (2006.01)
*B64C 27/06* (2006.01)

(56) References Cited

U.S. PATENT DOCUMENTS

| | | | | |
|---|---|---|---|---|
| 5,163,638 A | * | 11/1992 | Chaneac | B64C 27/82 244/17.19 |
| 5,542,818 A | * | 8/1996 | Monvaillier | B64C 27/82 416/134 A |
| 6,976,653 B2 | | 12/2005 | Perlo et al. | |
| 6,994,071 B2 | * | 2/2006 | Schwam | B64D 27/02 123/242 |

FOREIGN PATENT DOCUMENTS

| KR | 10-2011-0085541 A | 7/2011 |
|---|---|---|
| KR | 10-2013-0042337 A | 4/2013 |

\* cited by examiner

PROPELLER-TYPE VERTICAL TAKE-OFF AND LAND AIRCRAFT WITH TORQUE REMOVAL AND BALANCING FUNCTION

BACKGROUND

Field of the Present Disclosure

The present disclosure relates a propeller-type vertical take-off and land aircraft with a torque removal and balancing function.

Discussion of Related Art

The conventional propeller-type aircraft may use a rotor blade or propeller to generate a lift force for landing or take-off thereof. For this, the rotor blade or propeller may rotate in a high speed. This may lead to a torque corresponding to a rotation moment of the blade or propeller. The torque may act as a rotation force of a body of the aircraft, wherein the rotation force is opposite to that of the rotation moment of the blade or propeller.

In order to remove the torque for the propeller-type vertical take-off and land aircraft, a tail rotor or tail blade may be provided at a tail portion of the aircraft.

The tail rotor may be smaller than a main rotor. However, the tail rotor may increase a size of the aircraft and a complexity thereof. Thus, the tail blade may collide with an object to lead to an accident.

In order to overcome this problem, instead of the tail rotor or blade, a torque removal propeller may be provided on a bottom of the aircraft wherein the torque removal propeller may have different sizes from a main propeller above the torque removal propeller. The torque removal propeller may rotate in an opposite direction to the rotation direction of the main propeller. This may be disclosed in KR patent application No. 10-2011-0085541 and U.S. Pat. No. 6,976,653.

When the torque removal propeller is provided on the bottom of the body of the aircraft, the rotation of the torque removal propeller may generate a further lift force. This may increase an operational complexity of the aircraft.

Further, the rotation of the torque removal propeller may generate a further lift force. This may require a balancing operation between lift forces from the main rotation blade and the torque removal propeller.

When the torque removal propeller is exposed to an ambient air, the torque removal propeller may have an unstable operation due to the unstable air flow. This may lead to an unbalancing of the body.

SUMMARY

Thus, the present disclosure provides a propeller-type vertical take-off and land aircraft with a torque removal and balancing function, wherein in order to remove the torque due to the rotation of the main rotor, the tail rotor is not used or upper and lower rotors are not used, but the torque is effectively removed using a principle of an inertial and action-reaction, and a balancing is achieved using a gyro effect. This may improve a flying stability and balancing of the body.

In one aspect, there is provided a propeller-type vertical take-off and land aircraft with a torque removal and balancing function, the aircraft comprising: a body; a body support frame to support the body; at least one main rotor blade provided out of the body; a rotation rotor coupled centrally to the main rotor blade; a rotation drive axis operatively coupled to the rotation rotor; a main rotor motor operatively coupled to the rotation drive axis; and a counter-torque and balancing wheel disposed under the body support frame to be coupled to a torque-removal inverse motor to be configured to rotate in an opposite direction to a rotation of the main rotor blade, wherein the counter-torque and balancing wheel is configured to balance the body using a gyro effect, wherein the counter-torque and balancing wheel is housed in the body, wherein the counter-torque and balancing wheel has a circular top shape, and is made of a metal, wherein a weight thereof is concentrated on an outer circumference.

In one embodiment, the counter-torque and balancing wheel includes: a central coupler axially coupled to a rotation shaft of the torque-removal inverse motor; a connection extending around the central coupler, wherein the connection has weight-reduction holes defined therein; and a weight concentration portion extending around the connection, wherein the weight concentration portion is thicker that the connection such that a weight concentrates on the weight concentration portion.

In one embodiment, the weight concentration portion is formed of a planar plate or is bent upward or downward.

In one embodiment, the counter-torque and balancing wheel 200 has a 5% to 50% weight of a total weight of the aircraft.

In accordance with the present disclosure, the torque removal and balancing mechanism for the propeller-type vertical take-off and land aircraft may have a simple configuration and a lower cost. The torque removal and balancing mechanism may be housed in the body. Thus, the torque removal and balancing mechanism may not generate a further lift force. This may lead to a reliable operation of the aircraft.

DETAILED DESCRIPTIONS

Figure 1:
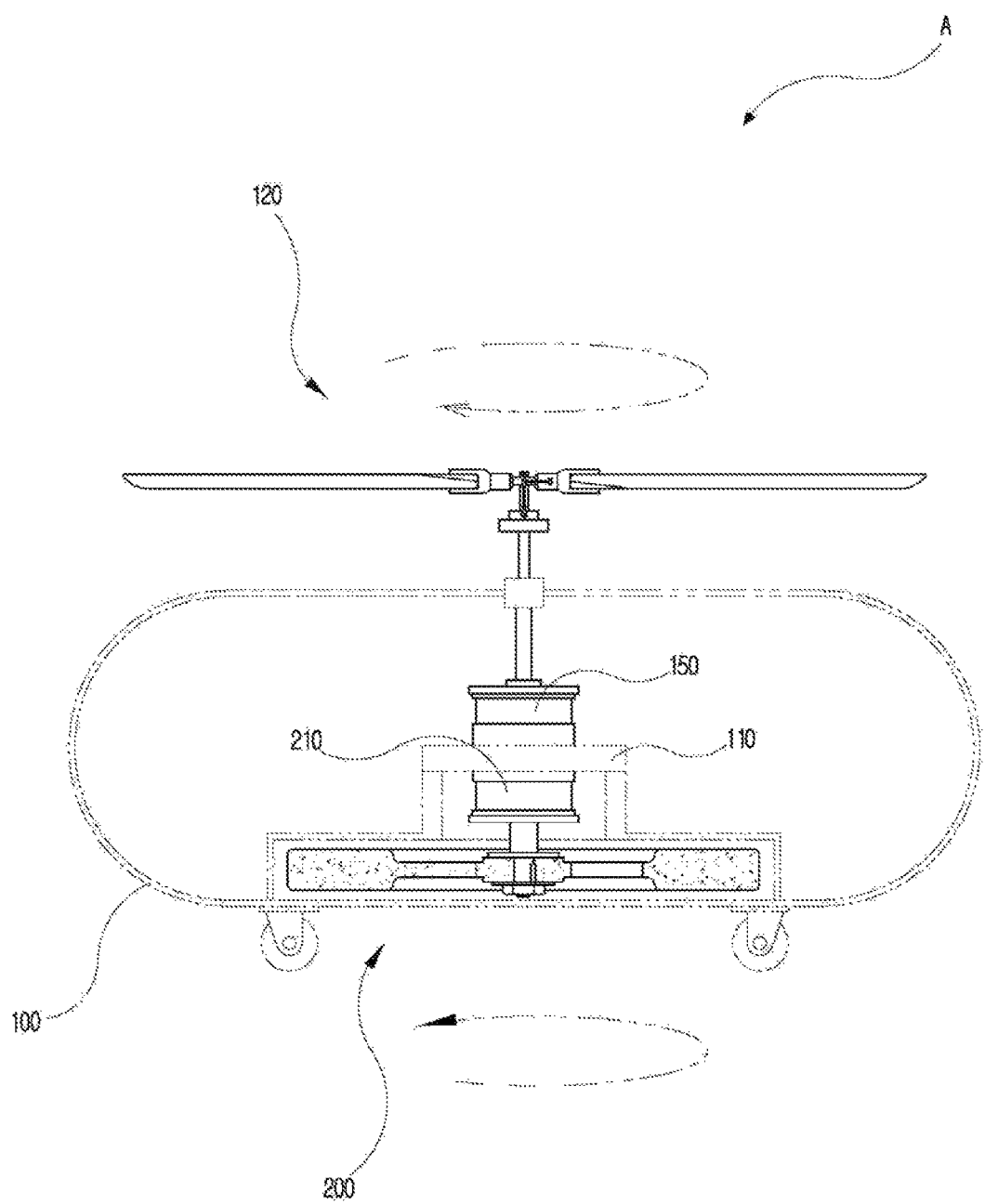
FIG. 1 shows an aircraft with a single propeller in accordance with one embodiment of the present disclosure wherein a counter-torque and balancing flywheel is employed.

Examples of various embodiments are illustrated in the accompanying drawings and described further below. It will be understood that the description herein is not intended to limit the claims to the specific embodiments described. On the contrary, it is intended to cover alternatives, modifications, and equivalents as may be included within the spirit and scope of the present disclosure as defined by the appended claims.

Example embodiments will be described in more detail with reference to the accompanying drawings. The present disclosure, however, may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art.

It will be understood that when an element or layer is referred to as being "connected to", or "coupled to" another element or layer, it can be directly on, connected to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises", "comprising", "includes", and "including" when used in this specification, specify the presence of the stated features, integers, s, operations, elements, and/or components, but do not preclude the presence or addition of one or more other features, integers, s, operations, elements, components, and/or portions thereof. As used herein, the term "and/or" includes any and all combinations of one or more of the associated listed items. Expression such as "at least one of" when preceding a list of elements may modify the entire list of elements and may not modify the individual elements of the list.

Spatially relative terms, such as "beneath," "below," "lower," "under," "above," "upper," and the like, may be used herein for ease of explanation to describe one element or feature's relationship to another element s or feature s as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented for example, rotated 90 degrees or at other orientations, and the spatially relative descriptors used herein should be interpreted accordingly.

Unless otherwise defined, all terms including technical and scientific terms used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In the following description, numerous specific details are set forth in order to provide a thorough understanding of the present disclosure. The present disclosure may be practiced without some or all of these specific details. In other instances, well-known process structures and/or processes have not been described in detail in order not to unnecessarily obscure the present disclosure.

Figure 2:
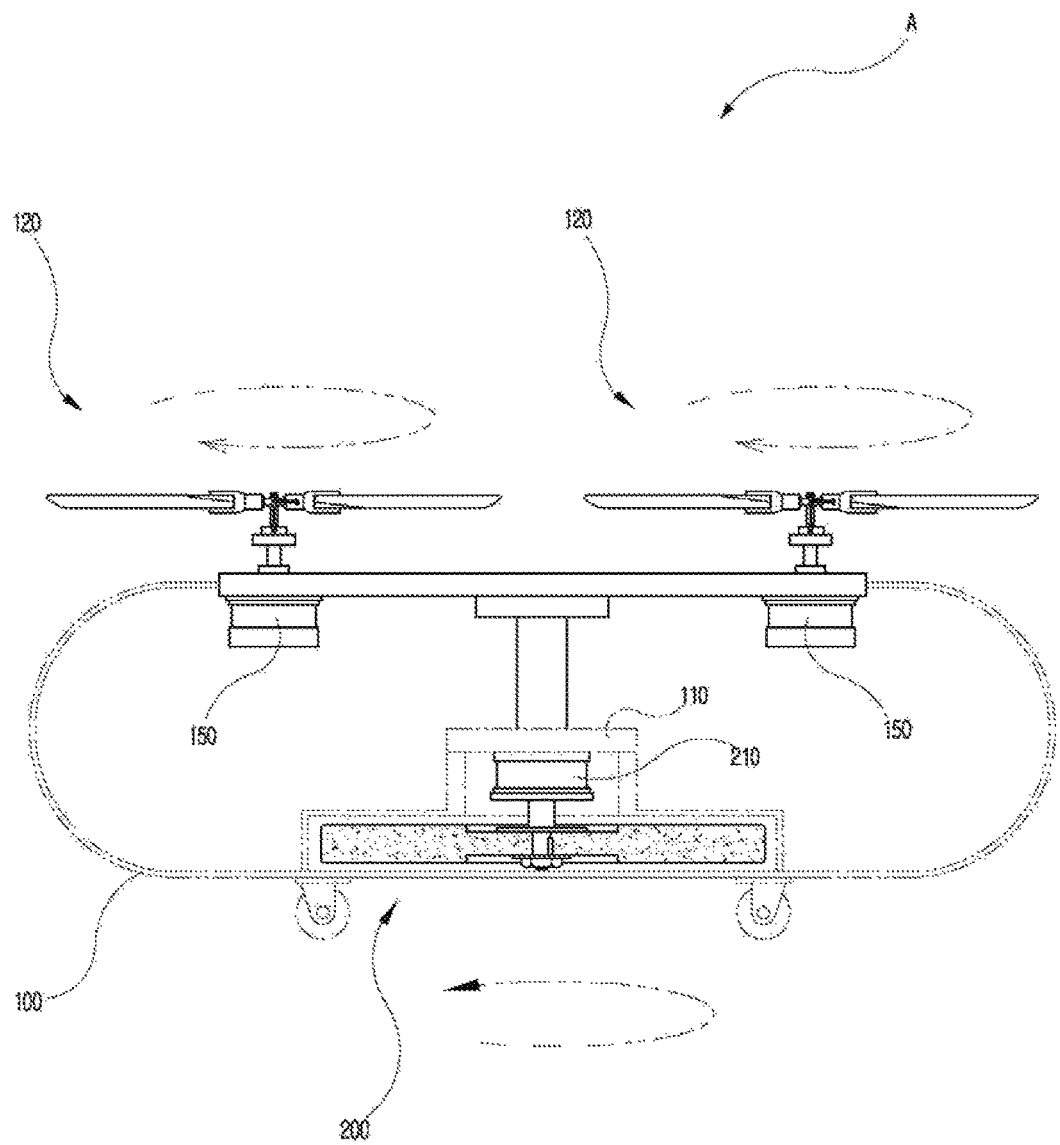
FIG. 2 shows an aircraft with a dual propeller in accordance with one embodiment of the present disclosure wherein a counter-torque and balancing flywheel is employed.
Figure 3:
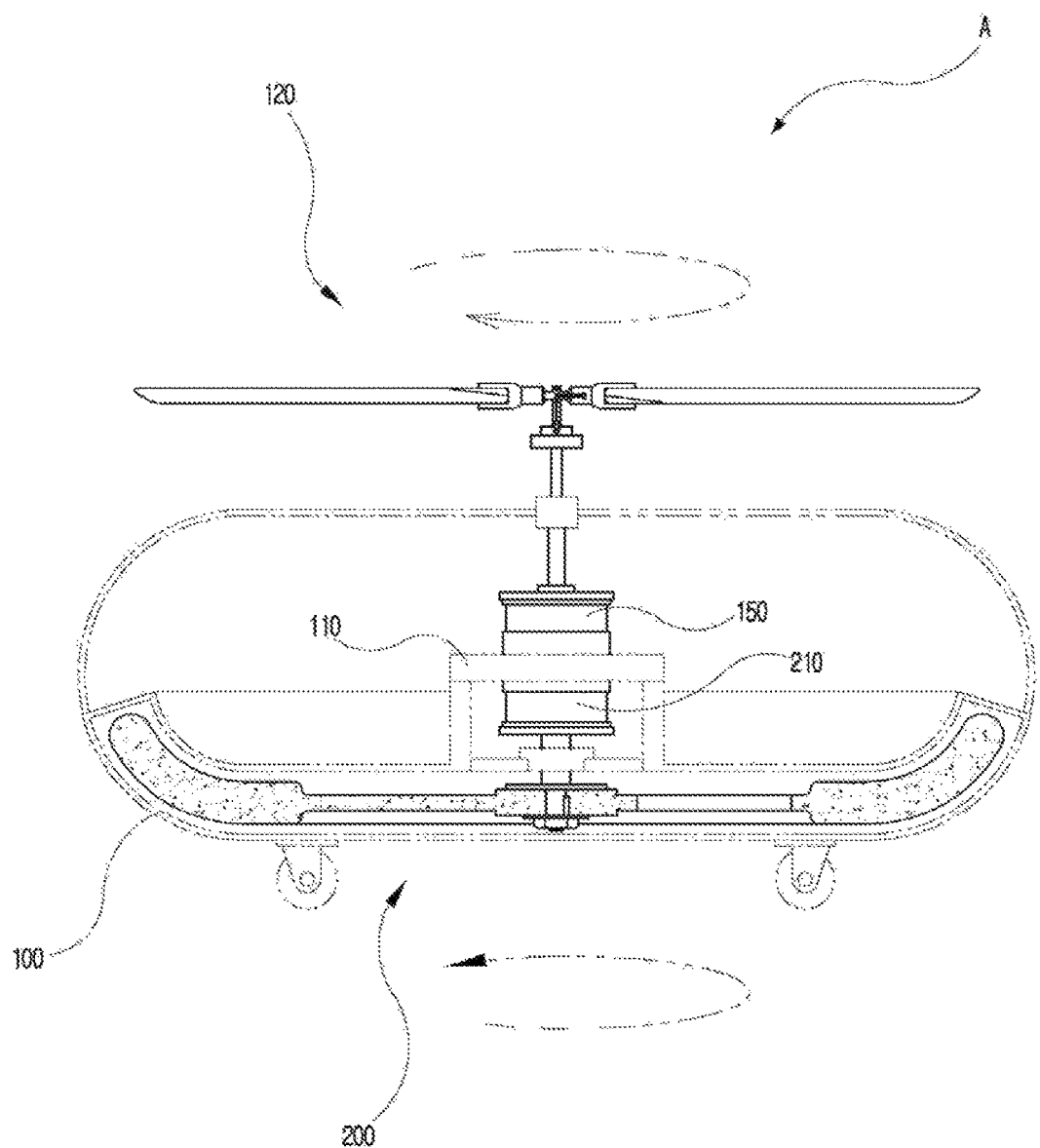
FIG. 3 shows an aircraft with a single propeller in accordance with one embodiment of the present disclosure wherein another counter-torque and balancing flywheel is employed.
Figure 4:
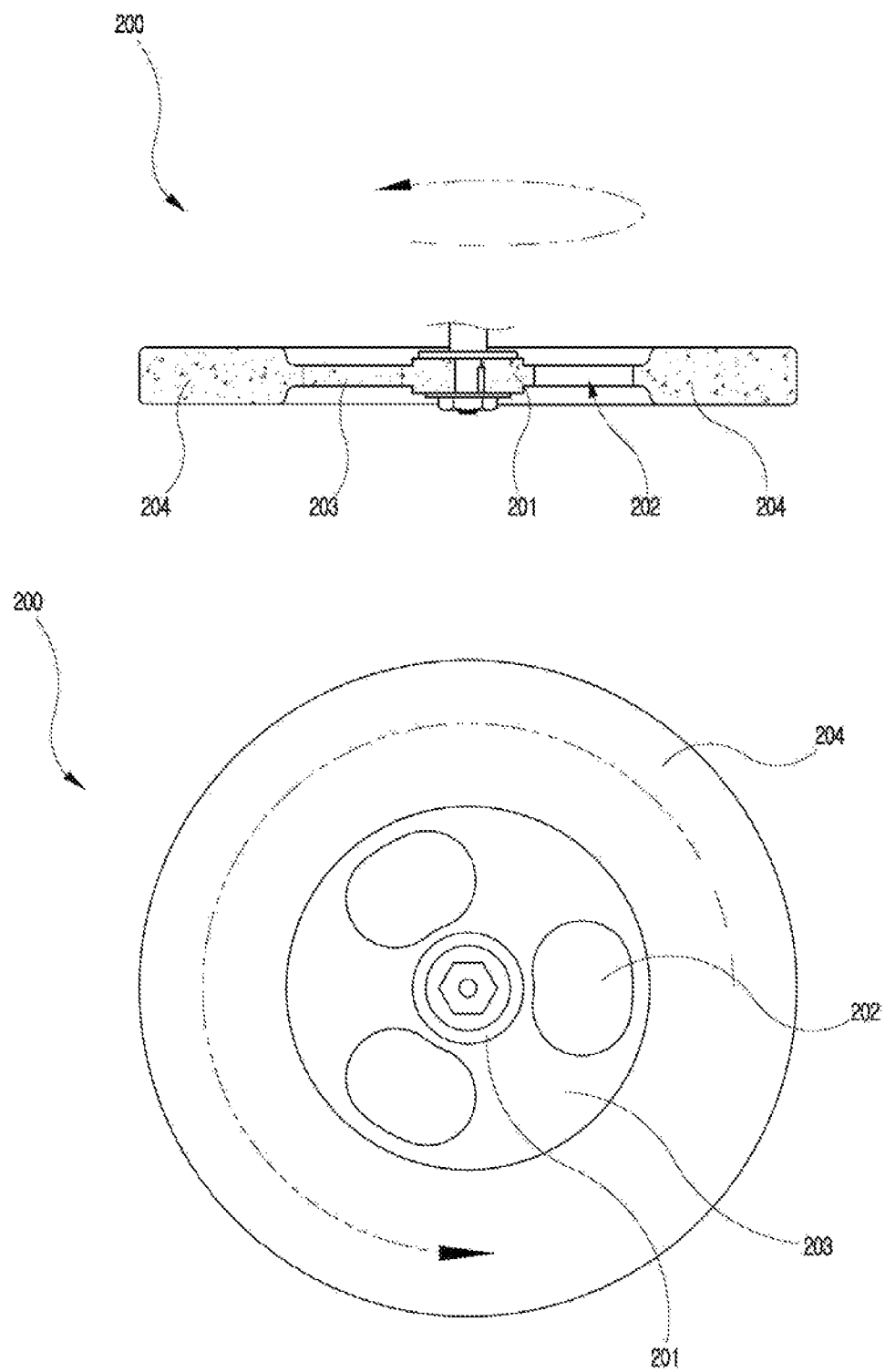
FIG. 4 shows details of a counter-torque and balancing flywheel employed in FIG. 1 and FIG. 2.
Figure 5:
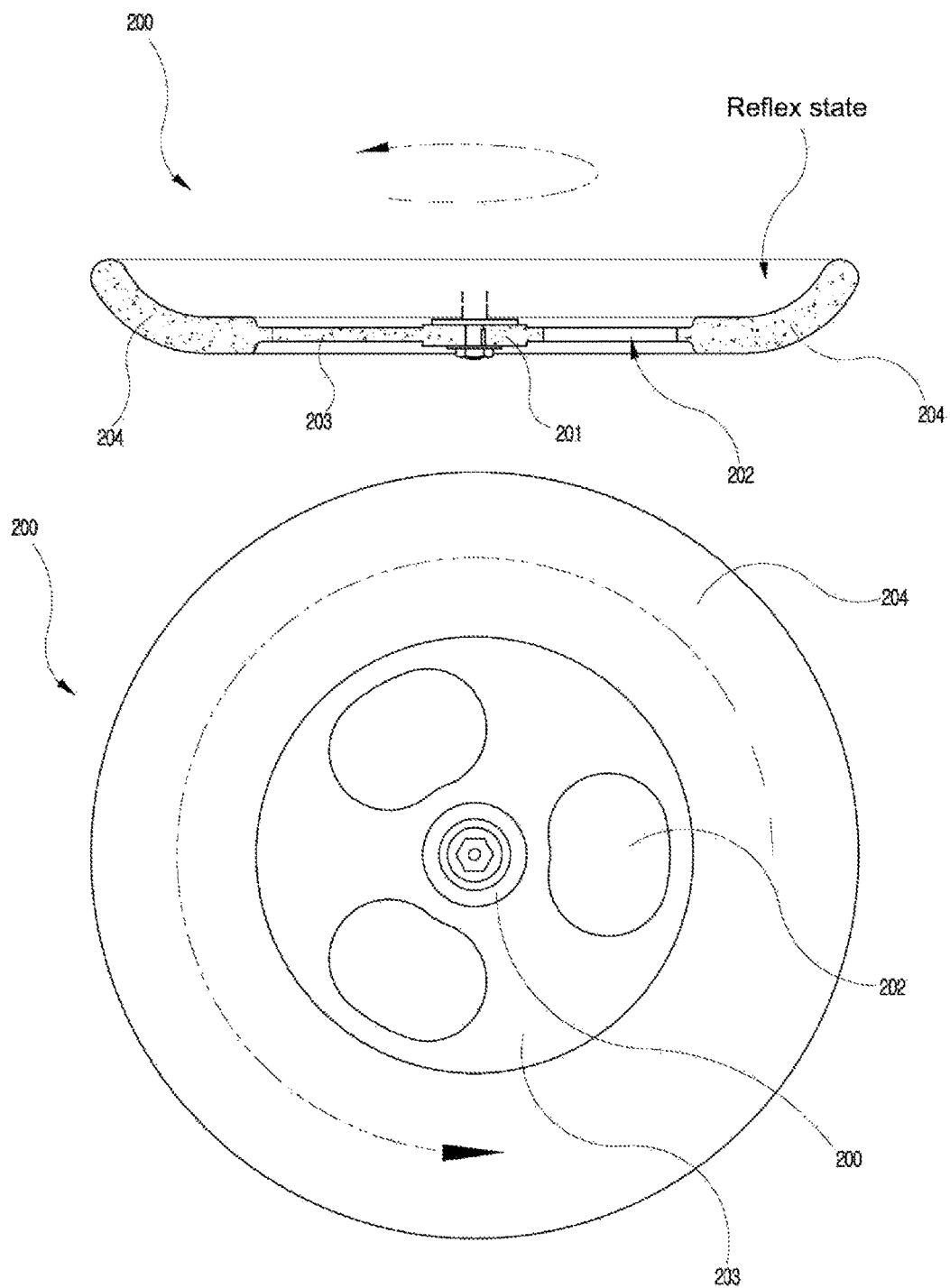
FIG. 5 shows details of a counter-torque and balancing flywheel employed in FIG. 3.

FIG. 1 shows an aircraft with a single propeller in accordance with one embodiment of the present disclosure wherein a counter-torque and balancing flywheel is employed. FIG. 2 shows an aircraft with a dual propeller in accordance with one embodiment of the present disclosure wherein a counter-torque and balancing flywheel is employed. FIG. 3 shows an aircraft with a single propeller in accordance with one embodiment of the present disclosure wherein another counter-torque and balancing flywheel is employed. FIG. 4 shows details of a counter-torque and balancing flywheel employed in FIG. 1 and FIG. 2. FIG. 5 shows details of a counter-torque and balancing flywheel employed in FIG. 3.

A torque removal and balancing device for a propeller-type vertical take-off and land aircraft in accordance with the present disclosure will be described in details with reference to accompanying drawings.

In the present disclosure, a propeller-type vertical take-off and land aircraft A with a torque removal and balancing function may include a body 100; a body support frame 110 to support the body; at least one main rotor blade 120 provided out of the body; a rotation rotor 130 coupled centrally to the main rotor blade 120; a rotation drive axis 140 operatively coupled to the rotation rotor 130; a main rotor motor 150 operatively coupled to the rotation drive axis 140; and a counter-torque and balancing wheel 200 disposed under the body support frame 110 to be coupled to a torque-removal inverse motor 210 to be configured to rotate in an opposite direction to a rotation of the main rotor blade 120.

The counter-torque and balancing wheel 200 may be further configured to balance the body using a gyro effect, wherein the counter-torque and balancing wheel 200 is housed in the body, wherein the counter-torque and balancing wheel 200 has a circular top shape, and is made of a metal, wherein a weight thereof is concentrated on an outer circumference. The counter-torque and balancing wheel 200 may be configured to effectively counter the torque due to the rotation moment of the main rotor blade 120.

The counter-torque and balancing wheel 200 may be formed of a rigid metal structure using a machining or casting. The counter-torque and balancing wheel 200 may a significant weight. The counter-torque and balancing wheel 200 may have a significantly high ratio of a diameter to a thickness thereof to have a rotation stability. A weight thereof is concentrated on an outer circumference to maximize the inertial and rotation moment thereof.

The counter-torque and balancing wheel 200 may include a central coupler 201 axially coupled to a rotation shaft of the torque-removal inverse motor 210; a connection 203 extending around the central coupler 201, wherein the connection 203 has weight-reduction holes 202 defined therein; and a weight concentration portion 204 extending around the connection 203, wherein the weight concentration portion 204 is thicker that the connection such that a weight concentrates on the weight concentration portion 204.

In one example, the weight concentration portion 204 may be formed of a planar plate as shown in FIG. 1, FIG. 2 and FIG. 4. In another example, the weight concentration portion 204 may be bent upward or downward as shown in FIG. 3 and FIG. 5. When the weight concentration portion 204 is bent upward or downward, the counter-torque and balancing wheel 200 may have a dish shape. In this way, the counter-torque and balancing wheel 200 may have a reduction of the diameter thereof and, at the same time, the increased weight concentration on the weight concentration portion 204.

The counter-torque and balancing wheel 200 may rotate together with a rotation of the torque-removal inverse motor 210. This rotation of the counter-torque and balancing wheel 200 may exhibit a significant rotation moment based on various conditions including a weight and distribution thereof and an acceleration. This may be based on a law of inertia and a law of action and reaction.

Furthermore, this rotation of the counter-torque and balancing wheel 200 may exhibit the gyro effect. Using the gyro effect, the body of the aircraft may be balanced.

The rotation moment due to the action and reaction of the counter-torque and balancing wheel 200 may remove the torque due to the rotation moment of the main rotor blade 120.

This rotation of the counter-torque and balancing wheel 200 may exhibit the gyro effect. Using the gyro effect, the body of the aircraft may be balanced. Thus, all of factors to imbalance the body may be removed using the counter-torque and balancing wheel 200.

In one example, the counter-torque and balancing wheel 200 may be implemented as a flywheel. A flywheel is a rotating mechanical device that is used to store rotational energy. Flywheels have an inertia called the moment of inertia and thus resist changes in rotational speed. The amount of energy stored in a flywheel is proportional to the square of its rotational speed. Energy is transferred to a flywheel by the application of a torque to it, thereby increasing its rotational speed, and hence its stored energy. Conversely, a flywheel releases stored energy by applying torque to a mechanical load, thereby decreasing the flywheel's rotational speed.

Further, the rotation of the counter-torque and balancing wheel 200 exhibit an inertial moment. This inertial moment may reduce a power consumption of the torque-removal inverse motor 210.

The counter-torque and balancing wheel 200 may have a simple configuration. The rotation of the counter-torque and balancing wheel 200 may not generate a lift force since the counter-torque and balancing wheel 200 is received or housed in the body.

Thus, the counter-torque and balancing wheel 200 may not be visible outside of the body. Thus, the aircraft seems like that it uses only the main rotor blade 120 to achieve a stable flying state. Further, the counter-torque and balancing wheel 200 may not interfere with the take-off and landing operations of the aircraft.

Further, the counter-torque and balancing wheel 200 may not be limited specifically in terms of a diameter when weight concentration portion 204 is formed of a planar plate or is bent upward or downward.

The counter-torque and balancing wheel 200 has a 5% to 50% weight of a total weight of the aircraft. When the counter-torque and balancing wheel 200 has a smaller than 5% weight of a total weight of the aircraft, the rotation moment value to counter the torque due to the rotation of the main blade may not be achieved.

When the counter-torque and balancing wheel 200 has a larger than 50% weight of a total weight of the aircraft, other components of the aircraft may not be disposed in the body. Further, the rotation power of the main blade should be increased.

REFERENCE NUMERALS

A: propeller-type vertical take-off and land aircraft
100: body
110: body support frame 120: main rotor blade
130: rotation rotor 140: rotation drive axis
150: main rotor motor
210: torque-removal inverse motor 200: counter-torque and balancing wheel

What is claimed is:

1. A propeller-type vertical take-off and land aircraft with a torque removal and balancing function, the aircraft comprising:
   a body;
   a body support frame to support the body;
   at least one main rotor blade provided out of the body;
   a rotation rotor coupled centrally to the main rotor blade;
   a rotation drive axis operatively coupled to the rotation rotor;
   a main rotor motor operatively coupled to the rotation drive axis; and
   a counter-torque and balancing wheel disposed under the body support frame,
   wherein the counter-torque and balancing wheel rotates in an opposite direction to a rotation of the main rotor blade, is coupled to a torque-removal inverse motor, is configured to balance the body using a gyro effect, is housed in the body, has a circular top shape, and is made of a metal, a weight of the counter-torque and balancing wheel being concentrated on an outer circumference thereof,
   wherein the counter-torque and balancing wheel includes:
   a central coupler axially coupled to a rotation shaft of the torque-removal inverse motor;
   a connection extending around the central coupler, wherein the connection has a first predetermined thickness thinner than the central coupler and has weight-reduction holes defined therein; and
   a weight concentration portion extending around the connection, wherein the weight concentration portion has a second predetermined thickness thicker than the connection such that the weight concentrates on the weight concentration portion.

2. The aircraft of claim 1, wherein the weight concentration portion 394—is formed of a planar plate or is bent upward or downward.

3. The aircraft of claim 1 wherein the counter-torque and balancing wheel 200—has a 5% to 50% weight of a total weight of the aircraft.

* * * * *